Sept. 3, 1957 J. A. TWO 2,804,946
MOTOR VEHICLE HYDRAULIC BRAKE WITH BOOSTER ATTACHMENT
Filed Jan. 4, 1954
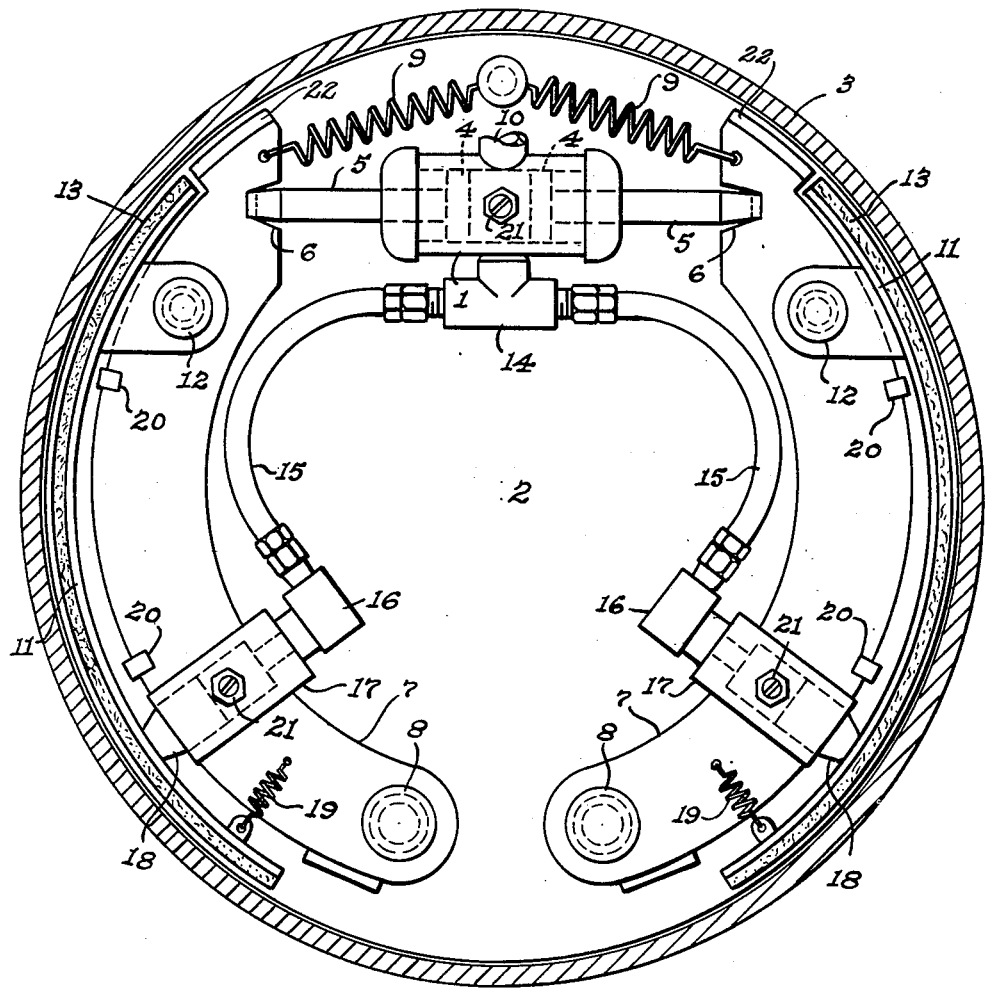
Inventor
Joseph A. Two 2,804,946
Patented Sept. 3, 1957

2,804,946

MOTOR VEHICLE HYDRAULIC BRAKE WITH BOOSTER ATTACHMENT

Joseph A. Two, Rockford, Ill., assignor of one-fourth to Francis W. Gaffney, one-fourth to Clarence J. McCue, and one-fourth to Clarence B. Paden, all of Rockford, Ill.

Application January 4, 1954, Serial No. 401,955

21 Claims. (Cl. 188—152)

This invention relates to hydraulic brakes for motor vehicles and is particularly concerned with one having a booster attachment designed to make for more complete brake shoe engagement and consequently more uniform distribution of wear and hence longer brake life and all around better braking action.

In the brake construction of my invention, the two opposed brake shoes instead of being pivoted at their one end on the diametrically opposite side of the flange from the brake cylinder so that their free ends are forced apart under hydraulic pressure when the brake is applied, causing only partial length engagement of the shoes, are pivotally mounted at one end on inner shoes that are pivoted at their other end to the flange diametrically opposite the cylinder, the inner or dummy shoes having booster cylinders thereon near their pivoted ends connected with the main cylinder for delivery of oil under pressure thereto at the same time that oil is delivered under pressure to the main cylinder, and these booster cylinders having pistons operable therein that engage the free end portions of the brake shoes so as to force the same into engagement with the brake drum under a somewhat lighter pressure than is applied at the pivoted ends of the inner shoes, whereby to insure more nearly complete engagement of said shoes and accordingly more nearly uniform wear and longer life and better braking effect.

The invention is illustrated in the accompanying drawing showing a brake drum in section in cooperative relation with a hydraulic brake mechanism made in accordance with my invention.

Referring to the drawing, the cylinder 1 is similar to the brake cylinder of a conventional Lockheed brake and is fixedly mounted on a conventional circular flange 2 with respect to which the brake drum 3 turns. The flange 2, in the case of a rear wheel, is fixed with respect to the rear axle housing, and in the case of a front wheel is fixed with respect to the front wheel spindle. The pistons 4, working in opposite directions in the cylinder 1, have their rods 5 extending from the opposite ends of the cylinder and engaged in notches 6 provided in the free upper end portions of two inner or dummy shoes 7 that are pivotally mounted on the flange 2 at their lower ends, as indicated at 8, whereby these shoes 7 are forced apart against the resistance of return springs 9 when oil under pressure from a master cylinder (not shown) is delivered to the cylinder 1 through the connection 10. In this outward movement of the shoes 7, the brake shoes 11, which are pivotally mounted on the shoes 7, as indicated at 12, are pressed into engagement with the inside of the drum 3 to slow down the rotation of the wheel or stop it. Linings 13 are provided on the shoes 11 to provide the desired friction and assume the wear incident to the braking operation. If the shoes 11 were rigid with shoes 7, the operation as thus far described would correspond substantially to what is obtained in the conventional Lockheed brake, but, in accordance with my invention, shoes 11 are pivoted at 12 adjacent the point of application of pressure to the free ends of the inner shoes 7, and pressure in reduced amount is applied to the free end portions of the shoes 11 through what I prefer to call a "booster" attachment provided on the pivoted end of each of the inner shoes 7, whereby more nearly complete brake engagement is obtained and more nearly uniform wear occurs on the linings 13.

A T-connection 14 is provided on the cylinder 1 from opposite sides of which extend flexible hose connections 15 to elbows 16 that are connected to booster cylinders 17, each of which preferably forms an integral part of the associated inner shoe 7 and has a piston 18 working therein and bearing against the free end portion of the adjacent brake shoe 11, whereby to press the free end portions of the shoes 11 into engagement with the brake drum under a slightly reduced pressure in relation to that exerted at the pivoted ends 12 of the shoes 11. The pistons 18 are of a diameter approximately three-fourths of the diameter of the pistons 4 so that the pressure applied to the free end portion of each shoe 11 is approximately three-fourths that applied to the pivoted end. A return spring 19 is provided between the free end portion of each shoe 11 and the pivoted end of the related inner shoe 7, and suitable stops 20 are provided on the inner shoe 7 to predetermine the retracted position of the shoes 11 with respect to shoes 7. The fittings indicated at 21 on the three cylinders are what are known as "bleeders" which are adapted to be opened to allow air to escape in the filling of the system with brake fluid.

In operation, brake shoes 11 are normally retracted into engagement with stops 20 under action of springs 19, while the inner shoes 7 are disposed in approximately the position shown, these being held retracted by springs 9. When the brake pedal (not shown) is depressed and oil under pressure is delivered from the master cylinder to the brake mechanism of each wheel, pistons 4 move the free ends of the shoes 7 outwardly against the action of springs 9, and at the same time pistons 18 move the free ends of brake shoes 11 outwardly against the action of springs 19. Thus, the pivoted ends 12 of the shoes 11 are engaged with the inner periphery of the brake drum 3 under a somewhat heavier pressure and simultaneously the free ends of the shoes are engaged with drum 3 under a slightly lighter pressure, and much better braking action is therefore obtained due to the substantially complete full length engagement of each brake shoe 11 with the brake drum 3 as distinguished from engagement of each shoe mostly at one end. The more nearly complete shoe engagement, besides giving better braking effect, gives more nearly uniform wear on the linings and consequently longer life. Good full length engagement of shoes 11 with drum 3 is insured because of the novel relationship of these shoes 11 to the inner shoes 7, the pivotally connected ends 12 of the shoes 7 and 11 being movable outwardly under the heavier pressure active on rods 5, while the other ends of the shoes 11 are subjected to outward pressure of pistons 18 working in cylinders 17 carried on the inner shoes 7 near their pivoted ends 8, thus getting the full benefit of the mechanical advantage in the actuation of these inner shoes 7 by rods 5 at their notched free end portions 6. The latter have arcuate drum engaging portions 22 struck on substantially the same arcs with linings 13.

It is believed the foregoing description conveys a good understanding of the objects and advantages of my invention. The appended claims have been drawn to cover all legitimate modifications and adaptations.

I claim:

1. In a fluid pressure brake, a fixed support, a brake drum associated therewith having a brake rim portion, a pair of opposed elongated arcuate brake shoes arranged for engagement with the inside of said rim portion, a second pair of opposed elongated shoes disposed radially inwardly with respect to said brake shoes and pivoted at one end on said support and pivotally connected at the other end to one end of said brake shoes, a pair of opposed fluid pressure operated pistons connected with the last mentioned end portions of said inner shoes to move the same and the pivotally connected ends of said brake shoes therewith relative to said support outwardly toward said rim portion, a second pair of fluid pressure operated pistons for engaging the other end portions of said brake shoes with said brake rim portion, and cylinders for said pistons carried by and movable with the inner shoes intermediate the ends thereof and adapted to have fluid delivered thereto from a source of fluid under pressure.

2. A fluid pressure brake structure as set forth in claim 1 wherein the first named pistons for actuating the inner shoes relative to said support are appreciably larger in diameter than the second named pistons for actuating the brake shoes.

3. A fluid pressure brake structure as set forth in claim 1 including spring means normally urging said inner shoes and brake shoes to retracted position.

4. A fluid pressure brake structure as set forth in claim 1 including separate spring means connected with said inner shoes and said brake shoes normally urging the same to retracted position.

5. In a brake, a fixed support, a brake drum associated therewith having a brake rim portion, a pair of opposed elongated arcuate brake shoes arranged for engagement with the inside of said rim portion, a second pair of opposed elongated shoes disposed radially inwardly with respect to said brake shoes and pivoted at one end on said support and pivotally connected at the other end to one end of said brake shoes, brake operating means connected with the last mentioned end portions of said inner shoes to move the same and the pivotally connected ends of said brake shoes therewith relative to said support outwardly toward said rim portion, other brake operating means carried by and movable with the second pair of shoes intermediate the ends thereof and connected with the other end portions of said brake shoes to move the same relative to said inner shoes outwardly toward said rim portion, and means connecting said two brake operating means to operate in unison.

6. A brake structure as set forth in claim 5 wherein the brake operating means connected with said inner shoes is arranged to apply a heavier braking pressure than the brake operating means connected with said brake shoes.

7. A brake structure as set forth in claim 5 including spring means normally urging said inner shoes and brake shoes to retracted position.

8. A brake structure as set forth in claim 5 including separate spring means connected with said inner shoes and said brake shoes normally urging the same to retracted position.

9. In a fluid pressure brake, a fixed support, a brake drum associated therewith having a brake rim portion, a pair of opposed elongated arcuate brake shoes arranged for engagement with the inside of said rim portion, a second pair of opposed elongated arcuate shoes disposed radially inwardly with respect to said brake shoes and pivoted at one end on said support and pivotally connected at the other end to one end of said brake shoes, a main brake cylinder carried on said support having a port for the admission of fluid under pressure, opposed pistons in said cylinder arranged for movement in opposite directions by fluid pressure therein and operatively engaging the last mentioned end portions of said inner shoes for actuation thereof, secondary cylinders carried on and movable with said inner shoes intermediate the ends thereof and having fluid conducting connections with said first mentioned cylinder for the delivery of fluid pressure therefrom, and pistons in said secondary cylinders operably engaging said brake shoes for actuation thereof movable substantially radially with respect to said drum.

10. A fluid pressure brake structure as set forth in claim 9 wherein the first named pistons for actuating the inner shoes relative to said support are appreciably larger in diameter than the second named pistons for actuating the brake shoes.

11. A fluid pressure brake structure as set forth in claim 9 including spring means normally urging said inner shoes and brake shoes to retracted position.

12. A fluid pressure brake structure as set forth in claim 9 including separate spring means connected with said inner shoes and said brake shoes normally urging the same to retracted position.

13. A brake comprising a fixed support, a brake drum associated therewith, a pair of shoes pivotally mounted on the support at their one end and having pivotally mounted on their other end in reverse relationship thereto a second pair of shoes for cooperation with the drum, said first mentioned pair of shoes having extensions on the last mentioned ends thereof, high pressure means operatively engaging these extensions for actuating the first mentioned shoes and accordingly actuating the pivotally connected ends of said second mentioned shoes, and relatively low pressure means carried by and movable with the first mentioned shoes near the pivoted ends thereof and operatively engaging the end of the second mentioned shoes remote from their pivoted ends for solely actuating the latter shoes relative to the first mentioned shoes.

14. A brake comprising a fixed support, a brake drum associated therewith, a pair of shoes pivotally mounted on the support at their one end and having pivotally mounted on their other end in reverse relationship thereto a second pair of shoes for cooperation with the drum, said first mentioned pair of shoes having extensions on the last mentioned end thereof, a main brake cylinder carried on said support having a port for the admission of fluid under pressure, opposed pistons in said cylinder movable in opposite directions by fluid pressure therein and operatively engaging said extensions solely for actuation of said first mentioned shoes, other smaller cylinders carried on and movable with said first mentioned shoes intermediate the ends thereof and having flexible conduits connecting the same with the first mentioned cylinder for the delivery of fluid pressure therefrom, and pistons in the last mentioned cylinders arranged for outward movement under fluid pressure substantially radially with respect to said drum and operably engaging the ends of the second mentioned shoes remote from their pivoted ends.

15. In a fluid pressure brake, a fixed support, a brake drum associated therewith having a brake rim portion, a pair of opposed elongated arcuate brake shoes arranged for engagement with the inside of said rim portion, a second pair of opposed elongated shoes disposed radially inwardly with respect to said brake shoes and pivoted at one end on said support and pivotally connected at the other end to one end of said brake shoes, a main brake cylinder carried on said support having a port for the admission of fluid under pressure, opposed pistons in said cylinder arranged for movement in opposite directions by fluid pressure therein and operatively engaging the last mentioned end portions of said inner shoes for actuation thereof, secondary cylinders disposed intermediate the ends of said inner shoes and movable therewith, each of said secondary cylinders having a port for the admission of fluid under pressure, and pistons in said secondary cylinders operably engaging said brake shoes in remotely spaced relationship to their pivotally mounted ends for actuation thereof and movable substantially radially with respect to said drum.

16. A fluid pressure brake structure as set forth in claim 15 wherein the first named pistons for actuating the inner shoes relative to said support are appreciably larger in diameter than the second named pistons for actuating the brake shoes.

17. A brake comprising a fixed support, a brake drum associated therewith, a pair of shoes pivotally mounted on the support at their one end and having pivotally mounted on their other end in reverse relationship thereto a second pair of shoes for cooperation with the drum, said first mentioned pair of shoes having extensions on the last mentioned end thereof, a main brake cylinder carried on said support having a port for the admission of fluid under pressure, opposed pistons in said cylinder movable in opposite directions by fluid pressure therein and operatively engaging said extensions solely for actuation of said first mentioned shoes, other smaller cylinders carried by and movable with said first mentioned shoes and disposed intermediate the ends of said first mentioned shoes, each of said smaller cylinders having a port for the admission of fluid under pressure, and pistons in the last mentioned cylinders arranged for outward movement under fluid pressure substantially radially with respect to said drum and operably engaging the ends of the second mentioned shoes remote from their pivoted ends.

18. A brake as set forth in claim 17, wherein the extensions on said first mentioned pair of shoes include portions arranged in the operation of the brake to engage the brake drum so as to give added braking effect.

19. In a brake, a fixed support, a brake drum associated therewith having a brake rim portion, an elongated arcuate brake shoe arranged for engagement with the inside of said rim portion, a second elongated arcuate shoe disposed radially inwardly with respect to the first mentioned shoe and pivoted at its one end on said support and pivotally connected at its other end to one end of said brake shoe, brake operating means connected with the last mentioned end portion of said inner shoe to move the same and the pivotally connected end of said brake shoe therewith relative to said support outwardly toward said rim portion, other brake operating means carried by and movable with the second shoe intermediate the ends thereof and operatively associated with the other end portion of said brake shoe to move the same relative to said inner shoe outwardly toward said rim portion, and means connecting said two brake operating means to operate in unison.

20. A brake structure as set forth in claim 19, wherein the inner shoe has an extension on that end thereof pivotally connected to the brake shoe, and said extension includes a portion arranged to engage the inside of said brake rim portion in the operation of the brake for added braking action.

21. A brake structure as set forth in claim 19, wherein the brake operating means connected with said inner shoe is arranged to apply a heavier braking pressure than the brake operating means connected with said brake shoe.

References Cited in the file of this patent

UNITED STATES PATENTS

| | | |
|---|---|---|
| 1,858,004 | Eason | May 10, 1932 |
| 1,929,594 | Loughead | Oct. 10, 1933 |
| 2,250,248 | Berglund | July 22, 1941 |
| 2,311,788 | Swift | Feb. 23, 1943 |

FOREIGN PATENTS

| | | |
|---|---|---|
| 671,120 | Great Britain | Apr. 30, 1952 |